Fig. 2

Rayleigh Scattering

Fig. 3

INVENTORS:
Lee B. Benson
Edwin N. Kaufman
Arnold D. Nudell
Robert E. Scott

By John B. Miller, Jr.
Agent

United States Patent Office 3,528,741
Patented Sept. 15, 1970

3,528,741
APPARATUS FOR MEASURING VELOCITY BY THE DETECTION OF SCATTERED LIGHT
Lee B. Benson, Edwin Nathaniel Kaufman, Arnold David Nudell, and Robert Emmett Scott, Los Angeles, Calif., assignors to Litton Systems, Inc., Beverly Hills, Calif.
Filed June 26, 1964, Ser. No. 378,203
Int. Cl. G01p 3/26; G01s 9/62
U.S. Cl. 356—28
16 Claims

ABSTRACT OF THE DISCLOSURE

Apparatus for measuring the velocity of a vehicle by scattering monochromatic light from particles of the fluid through which the vehicle is moving and computing the Doppler frequency shift in the received scattered light.

---

The present invention relates to apparatus for measuring the velocity of a vehicle relative to its surroundings and, more particularly, to apparatus for determining the velocity of a vehicle by detecting a shift in the frequency of light transmitted from the vehicle and returned to the vehicle after being scattered by particles of a surrounding medium.

The pilot or controller of any manually guided vehicle, in order to make decisions regarding the maneuvering of the vehicle within its design capabilities and structural limits, must have knowledge of the characteristics describing the movement and attitude of the vehicle. One such characteristic that must necessarily be known is the vehicle's velocity. To properly maneuver an aircraft, for example, the pilot must know its velocity relative to the air, termed the air-speed of the craft. The problem of accurately measuring vehicle air-speed has plagued aircraft manufacturers and users for many years. One difficulty which has been recognized is the inability to obtain an air sample which has not been disturbed by the movement of the vehicle. Similar problems have been recognized in measuring the velocity of other vehicles.

In the prior art, many different types of instruments have been employed for measuring vehicle air-speed. One commonly known air-speed indicator is a pitot-static head which is mounted at some convenient point on the aircraft. Efforts to obtain an undisturbed air sample have caused designers to locate the pitot-static type air-speed indicator on a projection extending from the leading edge of the aircraft wing, or on a boom extending from the nose of the aircraft, or projecting from the ventral side of the aircraft. In most of these applications, however, a change in the attitude of the plane with respect to the air mass causes misalignment of the pitot tube with air flow resulting in erroneous air-speed indications. Moreover, conventional air-speed indicators, which depend upon actual air flow for their readings, have several inherent disadvantages when employed in supersonic and hypersonic aircraft. Firstly, if a pitot- static or other air-speed indicator is employed which is of the type which projects from the wing, nose, or other part of the craft, it is possible that it will break off during a rapid maneuver of the craft, or burn off at some high velocity, or will be a source of vibration. Secondly, at altitudes greater than 120,000 feet, such air-speed indicators, which depend necessarily upon the flow of dense fluids, do not operate properly because of the extremely low air density and, at even greater altitudes, because of the concomitant lack of true molecular flow. In the case of helicopter-type aircraft, it is obvious that there is no undisturbed air mass which the pitot-static head may sense near the craft and, thus, air-speed indication by any air flow measuring device is extremely difficult.

In recent years, a large amount of research effort has been expended to develop a radar velocity indicator as a solution to the foregoing problems. This type of velocity indicator operates on the principle of measuring velocity by a shift in frequency of a signal transmitted to ground level and reflected back to the moving aircraft. While, generally, a radar velocity indicator operates satisfactorily at low altitudes and in level flight, during vehicle maneuvers (such as banks or rolls) and at altitudes above 100,000 feet such devices either do not operate or, if they operate, do not operate accurately.

Moreover, even if the radar antenna on-board the vehicle is oriented to be in line with the ground, if the vehicle is operating at a considerable altitude, the radio frequency signal emitted by the antenna is appreciably attenuated by the time it is received. The attenuation is partly attributable to the absorptive characteristics of the ionosphere and the ground. It is well known that energy from the transmitted signal is used up in setting the ionized particles of the ionosphere in motion, and in reflecting the signal off the ground. The amount of signal energy absorbed by the ground varies, of course, with the type of ground and the terrain (the amount of loss being least from sea water). In spite of the fact that amounts of attenuation can generally be computed for a particular locale, for a moving vehicle it is obvious that the amount of signal attenuation will be inconstant and, therefore, cannot be compensated. Thus, at one time of velocity measurement, the signal reflected from ground level may return to the vehicle substantially undiminished; while, at other times, the reflected signal may be attenuated and distorted to such a degree as to render it unusable. Such inconsistancies are intolerable.

The present inventors, recognizing these and other disadvantages of the prior art air-speed and velocity indicators, have turned their attention to developing a unique velocity indicator that accurately measures the velocity of any vehicle independent of vehicle orientation or altitude. In accordance with the basic concepts of the invention, their velocity indicator employs a light-frequency transmitter (such as a laser) which generates and projects to a point or region a selected distance from the vehicle a coherent light signal of a known frequency that is scattered (according to the Rayleigh light scattering principle) by the molecules of the fluid through which the vehicle is moving. The light scattered by the particles of fluid is detected by apparatus within the vehicle at a frequency offset from the known frequency by an amount proportional to the velocity of the vehicle through the atmosphere particles. This difference in frequency is, of course, due to the fact that the molecules of the fluid through which the vehicle is moving are in motion relative to the vehicle, the relative movement resulting in a concomitant Doppler shift in the frequency of the transmitted light signals.

As will be described in detail hereinafter, the ability of the present invention to measure velocity by detecting the Doppler frequency shift in light scattered by atmospheric constituents is provided by using a high-powered source of monochromatic light, such as the laser, to generate a beam which may be focused by a lens to a spot or region (termed the point or region of incidence) distant from the outer shell of the vehicle. The molecules of the atmosphere at the point of incidence scatter the light in various directions, the intensity of scattered light being proportional to the density of the gases comprising the atmosphere, the volume of the gas at the point of incidence, the intensity of the incident light beam, and the ability of the gas molecules to be polarized. The scattered light passes through a window in the side of the vehicle into a receiver system and is combined therein with a portion of the incident light beam, which has been diverted from the incident beam and routed so as to readily combine with the scattered light. A resultant light beam (comprising incident light signal, detected scatter signal and background radiation noise) is passed through a light-frequency band-pass filter to limit the background light frequencies to a level below that of the combined signals before the resultant light signal impinges upon a surface of a photodetector. The photodetector, in response to the applied light signal, generates an electrical current having a frequency indicative of the difference between the frequency of the incident beam and the frequency of the detected scattered light. This frequency difference is termed the beat frequency. The beat frequency signal, after being amplified, is applied to a frequency detecting circuit which translates the frequency value of the signal into units of velocity.

In connection with the embodiments of velocity indicating device described herein, it should be noted that the maximum Doppler frequency shift in the light rays reflected by atmospheric particles occurs in a direction parallel to the direction of motion of the vehicle. For slow moving vehicles it may be possible to focus the incident laser beam to the rear or ahead of the vehicle and measure with conventional circuitry the total Doppler frequency shift in the reflected light rays. On the other hand, if a velocity indicating device of the present invention is employed in a high speed, supersonic or hypersonic vehicle, special problems arise in transmitting the incident laser beam ahead or to the rear of the vehicle because of the fact that a maximum Doppler frequency shift as high as 20,000 megacycles may have to be detected. Normally, conventional frequency detection methods would not be applicable in such an event.

Thus, to illustrate one technique by which this problem may be solved, a preferred embodiment of velocity indicating device described herein is constructed to have the incident laser beam projecting in a direction at an angle $\theta$ to the direction of motion of the illustrated vehicle (a commercial jet aircraft), where $\theta$ is an angle between 0° and 90°. The receiver system is oriented within the vehicle such that its line of sensitivity is perpendicular to the direction of motion of the vehicle and intersects the line of projection of the incident laser beam at some angle $\phi$ where $\phi$ is the complementary angle of $\theta$ and is between 0° and 90°. Thus, when light is scattered by particles of the atmosphere at the points of incidence, the scattered rays detected by the receiver system have a frequency shift equal to the maximum frequency shift (due to the motion of the vehicle with respect to the particles) multiplied by the sine of the angle $\phi$ separating the line of sensitivity of the receiver and the line of projection of the incident laser beam.

In still another more basically described embodiment of the present invention, the incident laser beam is focused in a direction perpendicular to the direction of motion of the illustrated vehicle; while the receiver system is angularly oriented within the vehicle so that it line of sensitivity intersects the line of focus of the laser at the angle $\phi$. The measured Doppler frequency shift, notwithstanding this re-orientation of transmitter and receiver, is equal to the maximum frequency shift multiplied by the sine of the angle $\phi$.

Those skilled in the art will readily perceive that an accurate measurement of the velocity of almost any type of vehicle may thus be accomplished by employing the above-described technique with the velocity measuring apparatus of the present invention, whether the vehicle is traveling at subsonic or supersonic velocities, at sea level or at extremely high altitudes.

It is, therefore, an object of the present invention to accurately measure the air-speed of a moving vehicle independent of the vehicle's altitude and orientation with respect to the earth.

It is another object of the present invention to provide an apparatus, having no parts thereof projecting outside the vehicle, for measuring the velocity of a vehicle by detecting its relative velocity with respect to the particles of the atmosphere surrounding the vehicle.

It is yet another object of the present invention to detect the velocity of a vehicle by measuring the frequency shift in coherent light caused by molecule scattering in the medium surrounding the vehicle.

It is a further object of the present invention to measure the velocity of a vehicle irrespective of the turbulence created in the atmosphere around the vehicle.

The more important features of the invention have been broadly outlined to facilitate an understanding of the detailed description which follows and to assist in an appreciation of the contribution to the art. There are, of course, additional features of the invention that will be described hereafter and which will also form the subject of the claims appended hereto. Those skilled in the art will appreciate that the conception upon which this disclosure is based may be readily utilized as a basis for designing other structures for carrying out the several purposes of the invention. It is important, therefore, that the claims to be granted herein shall be of sufficient breadth to prevent the appropriation of this invention by those skilled in the art.

The novel features which are believe to be characteristic of the invention, both as to its organization and method of operation, together with further objects and advantages thereof, will be better understood from the following description considered in connection with the accompanying drawings in which two embodiments of the invention are illustrated by way of example. It is to be expressly understood, however, that the drawings are for the purpose of illustration and description only, and are not intended as a definition of the limits of the invention.

Figure 1:
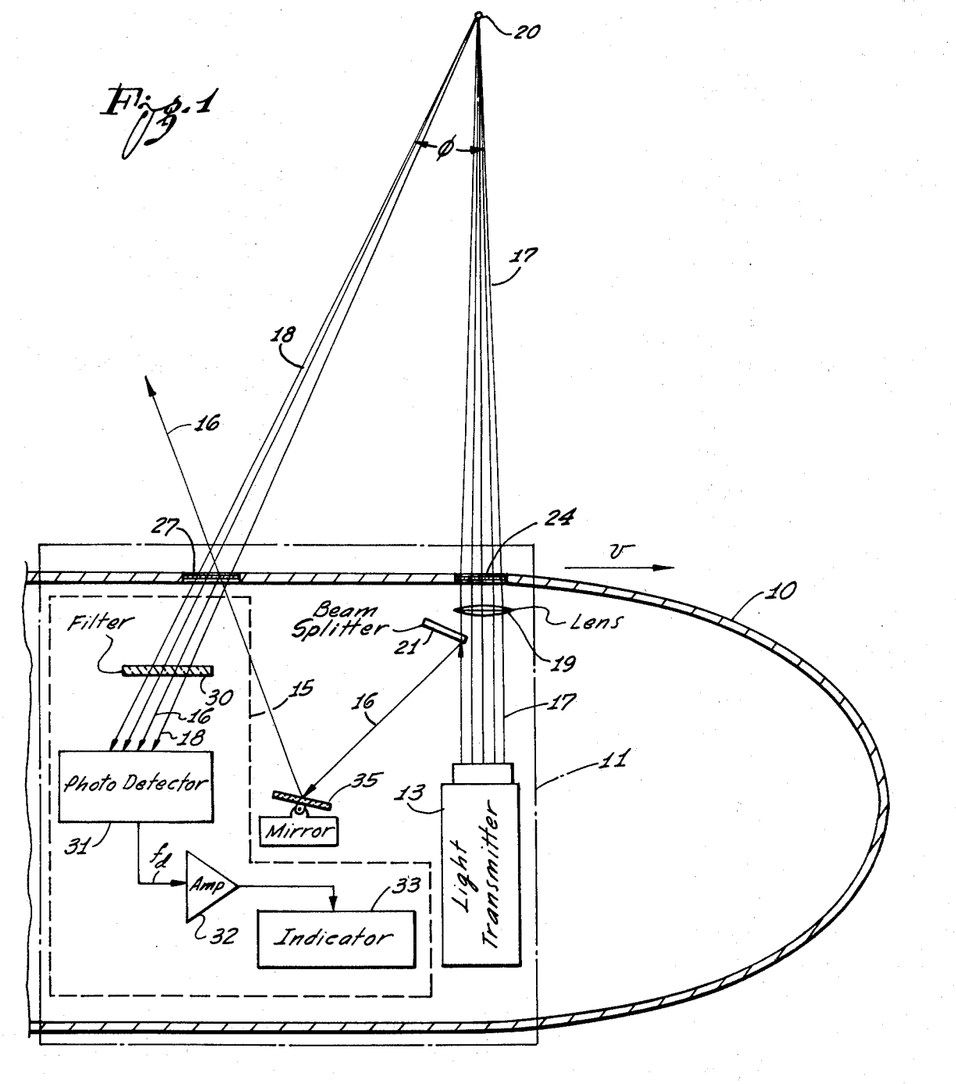
FIG. 1 is a block diagram of a velocity measuring system illustrating principles of the present invention.

With reference now to the drawings wherein like or corresponding parts are designated by similar reference characters throughout the several views, in FIG. 1 is shown a portion of a vehicle 10 employing a velocity measuring apparatus 11 (constructed in accordance with the principles of the present invention) which measures the velocity of the vehicle 10 by detecting a Doppler frequency shift in light rays reflected from atmospheric particles located at a point of incidence 20. As shown in FIG. 1, the velocity measuring apparatus 11 includes a coherent light transmitter 13 (such as a laser). An incident light beam 17 emitted by the laser 13 is focused by a double-convex, converging lens 19 through a port 24 in the vehicle 10 to a selected point of incidence 20 in the atmosphere. Since it is undesirable to have openings on the outer surface of a fast moving vehicle, the port 24 may be covered with a quartz or sapphire window, either of which is structurally strong and will easily pass the light beam emitted by the laser 13 without frequency derogation.

A number of light rays 18 are illustrated in FIG. 1 as being scattered by molecules of the vehicle's atmosphere at the point of incidence 20 and being radiated back toward the vehicle 10 and through a second port 27 in the side thereof. A beam-splitter 21 is shown intercepting a portion of the incident beam 17 and diverting therefrom a light beam 16 onto a mirror 35. The mirror 35, in turn, reflects the beam 16 toward the port 27. A quartz or sapphire window also covers the port 27; the port 27 window, however, is partially silvered so as to act as a partial reflector to the light beam 16. The beam-splitter 21, the mirror 35 and the partially reflective window 27 cooperate as a local oscillator to provide a light signal (light beam 16) of the incident frequency that will combine with the scattered rays 18 at the port 27 before their application to a light receiver system 15. The receiver system 15, in response to the impinged scattered rays 18 and the light beam 16, detects the frequency difference therebetween and converts this frequency difference to a velocity indication.

As specifically shown in FIG. 1, the receiver system 15 includes a light-frequency band-pass filter 30 that passes only a narrow range of wavelengths to substantially reduce background radiation received with the scattered rays 18. Such a band-pass filter is sometimes termed in the art as a multi-dielectric interference filter and often comprises four or more thin dielectric film layers of alternating quarter-wavelength thicknesses of, for example, zinc sulfide (ZnS) and magnesium fluoride ($MgF_2$) applied to a glass substrate. Such a band-pass filter is analogous to filters used in the theory of transmission lines, and is designed to pass a selected bandwidth of frequencies without absorbing much of the incident energy. The spacing of the dielectric layers is carefully adjusted such that the combination passes only light of a given wavelength and reflects all other incident light rays. One light frequency band-pass filter that may be employed in the present invention is the filter No. 2420, manufactured by Spectrolab, Inc.

The receiver system 15 still further includes a photodetector 31 which performs a process of photo-mixing on the two similarly-polarized beams of coherent light 16 and 18 of slightly different frequency when they are spatially coincident on a photo-sensitive surface of the detector 31. One type of convenient detector available today is a photo-multiplier tube (as, for example, RCA 7265) having a pass-band as wide as 300 megacycles. However, a semiconductor photo-diode seems to offer higher quantum efficiencies and is an ideal square-law detecting device capable of being used in a coherent detection system of the type employed in the present invention. While a more detailed analysis of the photo-mixing and coherent detection processes will be discussed hereinafter, it is important to realize at this point that the photo-detector 31, in response to the incident radiation from the polarized beams of coherent light of slightly different frequency, produces an electrical signal proportional to the square of the input optical power. During the squaring process of the detector, the received scattered light signal 18 and the local oscillator reference signal 16 are effectively multiplied together and a resultant beat frequency signal is produced which is representative of the frequency difference between signals 18 and 16. A beat frequency amplifier 32, following the photo-detector 31 in the circuit, is responsive to the beat frequency signal for amplifying this signal and applying it to a frequency indicator device 33. Such an indicating device may be, for example, a Hewlett-Packard Model 524D Frequency Counter, which directly measures frequency up to 510 megacycles. The frequency of the beat frequency signal is counted by the indicator electronics and is translated into terms representing the velocity of the vehicle 10 with respect to the molecules of the atmosphere at the point of incidence 20.

Before describing in greater detail the structures and operations of the persent velocity-measuring invention, it is well to briefly review the nature of the scattering phenomenon produced by the incident light beam 17 and the effects of this scattering phenomenon on one's choice of the particular structures used in mechanizing the invention. As mentioned previously, the effect used for obtaining measurable light (on the order of one micron in wavelength) scattered from fluid molecules (on the order of one millimicron) is the Rayleigh scattering phenomenon. Those skilled in the art recognize, of course, that Rayleigh scattering is most simply described by the equation $$I_{sc}=I_o\frac{16\pi^4\delta^2}{\lambda^4 R^2}NV \qquad (1)$$

where $I_{sc}$ is the intensity of the light scattered from the fluid molecules, $I_o$ is the intensity of the incident light beam, $\lambda$ is the wavelength of the incident light beam, $\delta$ is the polarizability of the fluid molecules (that is, the ratio of the molecule's dipole moment and the summation of the electric fields acting on the molecule), V is the volume of fluid at the point of incidence, R is the distance from the scattering volume at the point of incidence 20, and N is the number of molecules in the scattering volume. From only a brief examination of Equation 1 it is obvious to one skilled in the art, that, for a large intensity of back-scattered light, the light transmitter should emit a monochromatic, high-peak-power, short wavelength, and highly directional light beam. It is interesting to note that the above criteria are definitive characteristics of a pulsed laser beam. Ruby lasers, known in the art, emit pulses having a peak power of $10^9$ watts in a bandwidth less than 0.01 angstrom (A.) around a center wavelength of 6943 A.

In order to completely characterize incident and scattered light intensity in more meaningful terms than are obtained from Equation 1, one must know the phase of both incident and scattered light waves. This phase information can be incorporated into Equation 1 by working in terms of complex amplitude functions. The form of Equation 1 is a simplification of the actual scattering. In reality, $\delta$, the polarizability, is a tensor quantity causing the value of the equation to differ numerically depending upon the state of polarization of the outgoing light. By the use of a matrix formulation employing a set of intensity quantities called modified Stokes parameters, Equation 1 may be expanded to describe the light intensity of the scattered light caused by an incident beam polarized perpendicular to the scattering plane. The intensity of the scattered light 18 is then described by the equation $$I_{sc}=I_o\frac{16\pi^4}{\lambda^4 R^2}NV(3A+2B) \qquad (2)$$

where A and B are complex quantities in terms of $\Upsilon$ (scattering angle) and the coordinate components of $\delta$. Evaluating Equation 2 for any angle $\Upsilon$ will show that the magnitude of scattered light polarized perpendicular to the scattering plane is independent of scattering angle. Thus, the scattering pattern due to each molecule is circularly symmetric in the scattering plane.

Figure 2:
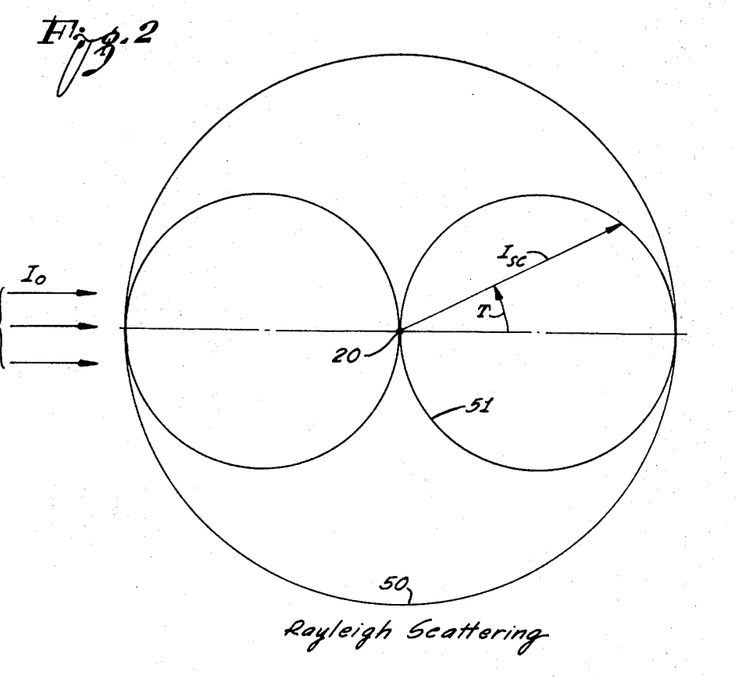
FIG. 2 is a light intensity diagram illustrating the scattering pattern of light transmitted by the system illustrated in FIG. 1.

With reference to FIG. 2, there is shown a curve 50 describing, generally, the intensity pattern of scattered light produced by a fully polarized light beam 17 of intensity $I_o$ having its electric field vector $\overline{E}$ perpendicular to the plane of the drawing and being incident upon the point 20. With the electric field vector $\overline{E}$ of the fully polarized light beam 17 parallel to the plane of the drawing, the intensity pattern is described generally by a curve 51, shown in FIG. 2. Moreover, the general relationship of the intensity $I_{sc}$ of back-scattered light to the incident beam 17 in the plane perpendicular to the scattering plane is described by the curve 50. Thus, it may be seen with reference to FIGS. 2 and 4 that the light receiver may track the light beam without angle sensitivity as long as the electric field vector of the received scattered light is perpendicular to the plane formed by the direction of sensitivity of the receiver and the incident light beam.

Figure 3:
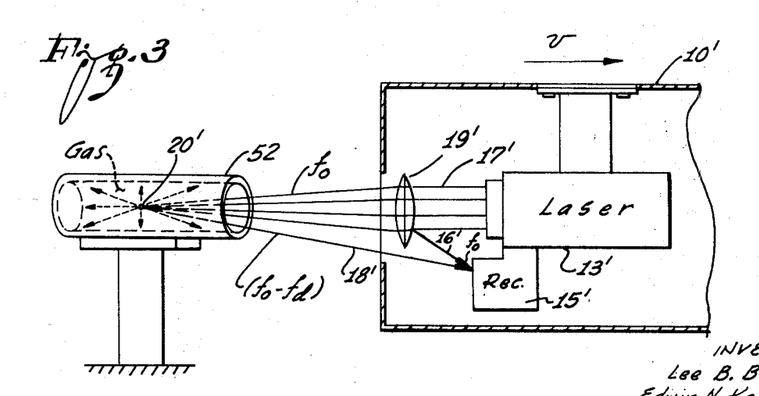
FIG. 3 is a diagram believed useful in illustrating principles of the present invention.
Figure 4:
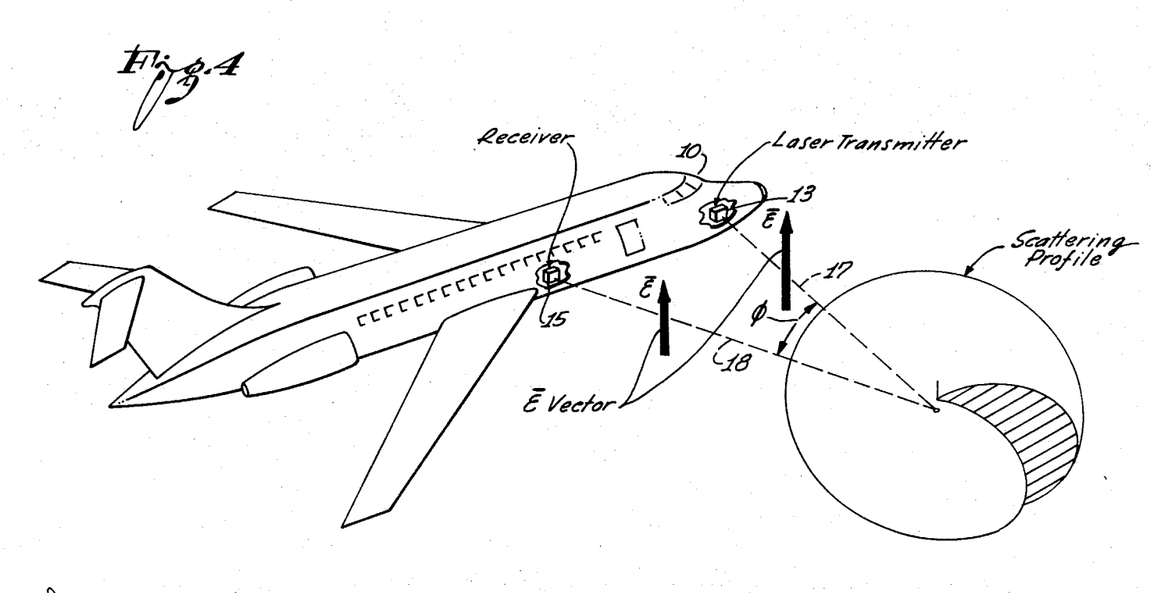
FIG. 4 is a perspective view of an aircraft employing a velocity measuring system in accordance with the present invention.

With reference to FIG. 3, consider now the basic equipment necessary to realize an effective velocity measurement by employing a focused laser beam. For the purpose of defining a scattering volume, assume a known volume of gas is contained in a cylinder 52 that may be considered to be permanently affixed at some station. The volume of gas is located sufficiently distant from a vehicle 10' so as to be unaffected by the movement of the vehicle. In a vehicle 10' are mounted a laser 13' and a receiver system 15', the vehicle 10' moving at a velocity $v$ away from the cylinder 52. If the laser 13' is pulsed and emits a light beam 17' of a frequency $f_o$ (which may be focused by a lens 19' into the fixed volume of gas within cylinder 52), the gas molecules will scatter the light beam 17', reflecting a ray 18' back to the receiver system 15'. The frequency, however, of the reflected light 18' is shifted from the transmitted frequency $f_o$ by the Doppler shift $f_d$, which is related to the velocity of the vehicle 10' by the equation $$f_d = \frac{2v}{\lambda} \quad (3)$$

where $v$ is the relative velocity between the vehicle 10' and the gas in cylinder 52, and $\lambda$ is the wavelength of the emitted light beam 17'. It has been found that the Doppler shift $f_d$ for a ruby laser beam (6943 A. wavelength) is on the order of 875 kc./ft./sec. (or, in round numbers, about 1 mc./ft./sec.) of relative velocity between the two bodies. If the system, then, is employed to measure the velocity of the vehicle 10' traveling at velocities generally less than the speed of sound, the frequency shift $f_d$ may be easily detected by one of the commonly known circuits in the art. However, if such a velocity measuring system should be employed on a supersonic or hypersonic vehicle (as illustrated in FIG. 4), whose velocities are often greater than 1000 feet per second or even 18,000 feet per second, it would mean that the Doppler frequency shift $f_d$ would be on the order of 1 to greater than 18,000 megacycles. Such a frequency shift is much too high to easily measure by conventional circuit techniques.

The present inventors thus propose that their velocity measuring system when employed on supersonic and hypersonic vehicles be oriented with respect to the direction of travel of the vehicle such that the laser beam is emitted in a direction perpendicular to the direction of motion of the vehicle. The direction of sensitivity of the receiver is then oriented at on angle $\phi$ with respect to the direction of emission of the laser beam, where $\phi$ is an angle between 0° and 90° from the direction of motion. The frequency shift detected by the receiver system is then the frequency shift due to the relative velocity between the gas molecules and the vehicle times the sine of the angle $\phi$, a frequency shift detectable by known coherent light detection techniques of the laser art.

Referring again to FIG. 1 it is thus apparent that the light transmitter 13, a laser, generates the high intensity, monochromatic, light beam 17 which is focused by the lens 19 through the port 24 at the point of incidence 20 in the atmosphere surrounding vehicle 10. As hereinbefore explained, the molecules at the point of incidence 20 scatter the light beam 17 and the scattered rays 18 pass through the port 27 in the vehicle 10 to be detected by the receiver system 15. Again noting that the port 27 window has been constructed so as to act as a partially transparent window to the light rays 16. The light rays 16, deflected from the incident light beam 17 by the beam-splitter 21, are diminished in amplitude by allowing part of the light rays 16 to pass through the window 27 out into the atmosphere and part of the light rays 16 to be reflected by the port 27 window. The mirror 35 may be appropriately located for causing the deflected light rays 16 to travel approximately the same distance as the incident light rays passing through the lens 19 to the point 20 and back again through the port 27. This feature enables the deflected rays 16 (the local oscillator signal) to arrive at the photo-detector 31 at substantially the same time as the scattered light signal 18. To further attenuate the local oscillator signal, the mirror 35 may be constructed (in a similar manner as was hereinabove described for constructing the window 27) such that it partially absorbs the energy of the local oscillator signal.

The reflected light rays 16 intermingle and combine with the scattered light rays 18 passing through the window 27. The light beams 16 and 18 having combined are incident upon the filter 30 which passes only a very narrow range of wavelengths (on the order of 10 A.) centered on the ruby laser wavelength of 6943 A. and limits the background light frequencies to a level substantially below that of the combined light beams 16 and 18.

Light passed by the filter 30 falls upon the photo-detector 31, which acts as a square-law detector to provide an electrical output signal whose frequency is proportional to the Doppler frequency shift in the received light signal. By impinging the combined and filtered light beams 16 and 18 on the photo-detector 31, a photo-mixing process is initiated whereby the Doppler frequency shift is detected. More specifically, the application of the combined light beams 16 and 18 to the photo-cathode of a photo-multiplier tube sets up a chain reaction of secondary emissions of electrons (based on the photoelectric effect) culminating at the output electrode of the tube. During this series of secondary emissions, the reference signal 16 beats with the received scattered light signal 18 and the signal spectrum is essentially converted to a frequency equal to the difference between the two applied signals 16 and 18.

The beat frequency signal generated by the photo-detector is applied to the beat frequency amplifier 32, which may comprise one of a number of well known amplifiers, for increasing the magnitude of the beat frequency signal so that it may be applied to the indicator electronics 33. In response to the application of the amplified beat frequency signal, the indicator electronics counts the frequency of the beat frequency signal and displays the counted frequency as an indication of the velocity of the vehicle 10.

Figure 5:
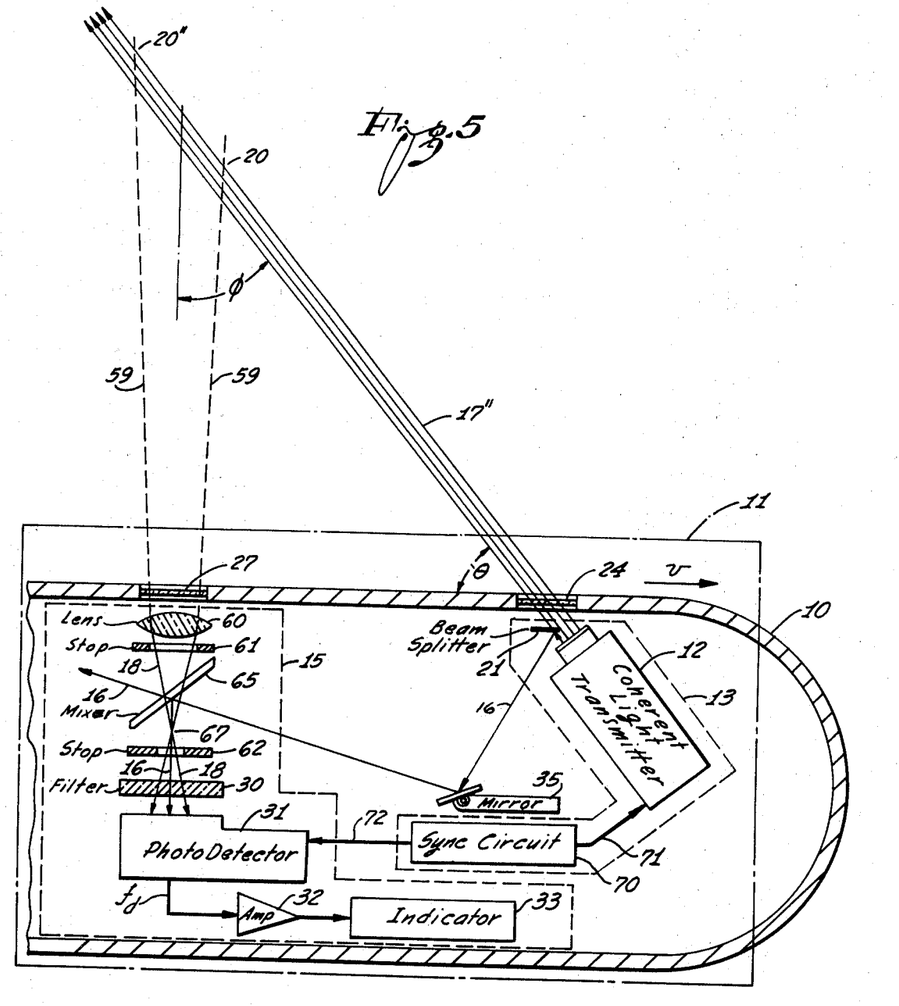
FIG. 5 is a block diagram of a preferred embodiment of velocity measuring system constructed in accordance with the principles of the present invention.

A preferred embodiment of velocity measuring apparatus 11, employed to measure the velocity $v$ of the vehicle 10, is illustrated in FIG. 5. The similarity between the embodiment of the present invention illustrated in FIG. 5 and the previously described embodiment of FIG. 1 is readily apparent. However, it will be noticed that the velocity measuring apparatus 11 illustrated in FIG. 5 is constructed to solve, in a different manner, the problems hereinabove described related to measuring the velocity of supersonic vehicles. More specifically, the apparatus 11 is constructed in such a manner that the light transmitter 13 is oriented with respect to the direction of travel of the vehicle 10 so that a light beam 17" is emitted in a direction at an angle $\theta$ to the direction of motion of the vehicle, where $\theta$ is an angle between 0° and 90°. The direction of sensitivity of the receiver 15 is oriented, then, generally perpendicular to the direction of vehicle motion and intersects the emitted light beam 17" at an angle $\phi$, where $\phi$ is equal to $(90° - \theta)$ and is between 0° and 90°. As hereinabove described, the frequency shift in the light rays 18 scattered from molecules of atmosphere intercepted by the light beam 17" and within the field of view of the receiver system 15 is equal to the frequency shift due to the relative velocity between the molecules and the vehicle between the molecules and the vehicle multiplied by the sine of the angle $\phi$.

The light transmitter 13 of the preferred embodiment may comprise a laser and, more particularly, a giant-pulse laser 12. While lasers have been in existence only a few years, from their conception they have received widespread acclaim and recognition of their scientific and practical value. A ruby laser, proposed as one type of light transmitter that may be used in the present invention, was first successfully opearted by Dr. T. H. Maiman of Hughes Aircraft Corporation. Dr. Maiman's article entitled "Stimulated Optical Radiation in Ruby Masers," published in August 1960, in the periodical Nature, volume 187, pages 493 and 494, basically decribes the theory and operation of his deivce. More recently, the theory and structure of the laser have been developed to a point where intense and controllable pulsations are obtainable from a ruby laser. One technique of obtaining these "giant" pulses from what is commonly known as a giant-pulse laser is described, for example, in a technical paper entitled "Characteristics of Giant Optical Pulsations from Ruby" by F. J. McClung and R. W. Hellwarth, published in the January 1963, issue of the Proceedings of the Institute of Electrical and Electronics Engineers, volume 51 at pages 46 through 51, inclusive. Since lasers, generally, and giant-pulse lasers in particular are so well known in the scientific community and well described in the literature, a detailed description of the laser used in the invention will not be presented.

Again referring to FIG. 5, the coherent light transmitter 13, which may comprise a giant-pulse laser 12, in response to a command signal 71 emits a high-intensity, mono-chromatic light beam 17", comprising essentially parallel light rays. The light beam 17" passes through a window 24 in the side of the vehicle 10 at an angle $\theta$ and passes out into the atmosphere surrounding the vehicle. It should be noted that, because the laser beam does comprise parallel light rays (a "pencil beam," as it is called), the lens for focusing the light beam 17" to a point of incidence (as illustrated in FIG. 1) has been omitted from this embodiment. In the receiver system 15, however, there has been included an optical system that (as illustrated in FIG. 5) includes a lens 60 focused on a known part of light beam 17" and a pair of lens stops 61 and 62, respectively, which cooperate to limit the field of view of the lens 60 between the boundaries 59. The size of the respective apertures in stops 61 and 62 are precisely determined so that they subtend an angle defining a relatively narrow field of view, termed the telescope acceptance angle $\rho$. The optical system enables the receiver 15 to detect only light scattered by molecules of the atmosphere that have been intercepted by the light rays of the light beam 17" between the points of incidence 20 and 20", on the outer limits of the field of view of the lens 60.

One can readily perceive that the direction of sensitivity of the receiver 15 has been oriented to be perpendicular to the direction of motion of the vehicle 10. As explained above in connection with the embodiment illustrated in FIG. 1, this orientation enables the receiver 15 to measure only a fraction of the total Doppler frequency shift in the frequency of the incident light scattered by the atmosphere particles. The fraction measured is again determined by the sine function of the angle $\phi$ separating the direction of emission of the laser light beam 17" and the direction of sensitivity of the receiver system 15. The measured-fraction of Doppler shift may be increased by relocating the light transmitter 13 and the receiver 15 so as to increase the angle $\phi$. Moreover, the field of view of the receiver 15 through the lens 60 may be restricted still further by forming the apertures in the stops 61 and 62 in the shape of narrow slots. Thus, the receiver 15 could be restricted in one plane to view only the approximate width of the laser light beam 17" between the points 20 and 20".

In order to combine the received scattered light rays 18 with the reference signal 16 of the incident frequency, the receiver 15 of the embodiment of the invention illustrated in FIG. 5 employs a light mixer 65 which may comprise a generally clear piece of glass tilted at an angle whereby only a fraction of incident light on the glass is reflected; the remainder of the incident light is passed through the glass. Thus, substantially all of the received scattered light beams 18 pass through the mixer 65 and combine with the small fraction of the reference signal 16 that is reflected by the mixer 65.

While not illustrated in the embodiment of the invention shown in FIG. 5, a double-concave lens or a plano-concave lens may be included in the optical system of the receiver 15 if it is desired to re-collimate the received light rays 18 after they have passed through the lens 60. Such a collimating lens would be generally located between the lens 60 and its focal point 67. Received light rays 18 gathered by the lens 60 and tending to be focused through the point 67, upon passing through such an appropriately-positioned collimating lens, would be rendered parallel to one another. Re-collimation of the gathered light rays 18 by the means described, or by other means may be advantageous to affect a more complete consolidation of the light rays 18 and the reference light signal 16 and their subsequent mixing on the photo-cathode of the photo-detector 31.

The final distinguishing feature of the embodiment of the invention illustrated in FIG. 5 over that embodiment shown in FIG. 1 is the addition of a sync control circuit 70 to the velocity measuring apparatus 11. The sync control circuit 70 has been included to conserve the operational life of the photo-detector 31 by applying a control signal 72, for activating the photo-detector 31, to the photo-detector only when the laser 12 has been actuated by the application of the command signal 71. To accomplish this function, the sync circuit 70 may comprise, for example, logical gating circuits and timing circuits. These circuits cooperate in such a manner that, in response to an inquiry from the pilot of the vehicle 10 channeled electrically or mechanically to the sync circuit 70, the sync circuit 70 generates signals that control the precise moments when the light transmitter 13 and the receiver system 15 are activated and the length of time each continues in operation.

In operation, the velocity measuring system 11 illustarted in FIG. 5 functions in a similar manner to the embodiment of the invention illustrated in FIG. 1. In response to an inquiry from the pilot of the vehicle 10, the sync circuit 70 applies the command signal 71 to the giant-pulse laser 12 of the light transmitter 13. The laser 12, for the duration of the command signal 71, emits a light beam 17". Simultaneously, the receiver system 15 is actuated by the application of the control signal 72 to the photo-detector 31. Light, scattered toward the vehicle 10 by particles of the atmosphere within the field of view (designated by the boundaries 59) of the lens 60 between the points 20 and 20", is gathered by the lens 60 of the receiver 15 and combined by the mixer 65 with an attenuated portion of the incident light beam used as the reference signal 16. The combined light beams 16 and 18 pass through the filter 30 and impinge upon the photo-detector 31, which acts as a square-law detector to provide the electrical output signal $f_d$ whose frequency is proportioned to the Doppler frequency shift in the received light signal 18. As previously described, the signal $f_d$ (after having been increased in magnitude by the amplifier 32) is applied to the indicator electronics 33 which converts the frequency of the signal to terms of velocity and displays the velocity reading to the pilot of the vehicle.

It is to be understood that the above described arrangements are illustrative of the application of the principles of the invention. Numerous other arrangements may be devised by those skilled in the art without departing from the spirit and scope of the invention. Thus, by way of example and not of limitation, other types of coherent light transmitters may be used to generate the incident beams 17 and 17". It is expected that, at the rate which the technology of coherent light transmitters is advancing, in the near future more controllable and higher intensity coherent light source will be available for employment in the present invention. Still further, there are in the optical filter art a number of optical filters which may be substituted for the filter 30 described hereinabove for filtering from the combined local oscillator reference and reflected light ray signals those frequencies which are unwanted.

Moreover, the receiver system may employ a number of well known photomultiplier tubes or photo-diodes for the square-law detection of the frequency difference between the incident beam and the scattered light, and the generation of a representative signal. More particularly, by way of example, the possibility of being able to use semi-conductor photo-diodes for photo-mixing in the present system is a constantly increasing one. The process of photo-mixing in semi-conductor junctions arises from the fact that the optical-absorption pair excitation process is inherently non-linear. Generally, the number of generated pairs is directly proportional to the square of the electric field vector which characterizes the incident radiation. A detailed description of coherent light detection in solid-state photo-diodes is found in the January 1963, issue of the Proceedings of the Institute of Electrical and Electronics Engineers, volume 51 at page 166 through 172. Accordingly, a more detailed explanation is deemed to be unnecessary; but those skilled in the art may easily see that such a photo-detection means may be employed in many of the velocity measuring systems of the present invention.

The beat frequency amplifier and indicator electronics described above may be replaced by many of the amplifiers and display systems known to those skilled in the art without departing from the spirit or scope of the invention. What is required is that the frequency of the signal generated by the photo detector be converted to terms of velocity in some efficient manner.

Referring to the construction of the port windows 24 and 27, it will be recognized that numerous materials currently being developed in the art and techniques for using these materials may be employed in the mechanization of the present invention to provide strong transparent windows in the side of a vehicle through which the light rays may pass readily. Moreover, the other optical components, beam splitter 21, mirror 35 and the lens 19 may be constructed to fit the particular application of the invention.

Accordingly, from the foregoing it is evident that various changes may be made in the structure used to mechanize the present invention without departing from the spirit and scope of the invention.

What is claimed as new is:

1. Apparatus for determining the velocity of a vehicle relative to the atmosphere adjacent the vehicle by measuring the frequency shift of light scattered by the atmosphere comprising:
   means for generating and projecting a mono-chromatic light beam of a first frequency to a location a preselected distance and direction, sufficiently far from said vehicle that the flow of said atmosphere at said location is substantially unaffected by the passage of said vehicle, to cause the atmosphere at said location to scatter said light; and
   means attached to said vehicle for detecting a portion of said scattered light at a second frequency and a portion of said light beam at said first frequency and for generating a signal proportional to the frequency difference between said first frequency and said second frequency whereby said difference frequency is a measure of the relative velocity between said vehicle and said atmosphere.

2. Apparatus for determining the velocity of a vehicle relative to a surrounding fluid comprising:
   a laser mounted to said vehicle for generating and projecting a light beam of a first frequency to a location in said fluid a preselected distance and direction, sufficiently far from said vehicle that the flow of fluid at said location is substantially unaffected by the motion of said vehicle through said fluid;
   said fluid at said location scattering said light beam at a second frequency;
   a photo-detector mounted upon said vehicle and oriented to receive light scattered by said fluid, and including means responsive to a portion of said light beam to direct light of said first frequency to said photo-detector, to produce a signal having a third frequency equal to the difference between said first frequency and said second frequency; and
   means responsive to said signal for converting said third frequency into a measure representative of velocity of said vehicle relative to said fluid.

3. Apparatus for determining the velocity of a vehicle as described in claim 2 which further includes an interference filter positioned within said vehicle and interposed between said photo-detector and said location.

4. Apparatus for determining the velocity of a vehicle as defined by claim 3 in which said means responsive to a portion of said light beam comprises means for diverting to said photo-detector a portion of said light beam as it emerges from said laser.

5. Apparatus for determining the velocity of a vehicle, relative to a fluid surounding said vehicle, said apparatus comprising:
   a coherent light transmitter upon said vehicle for generating a coherent light beam of a first frequency, mounted to direct said beam into said fluid in a predetermined direction from said vehicle;
   means for focusing said light beam to a region within said fluid sufficiently far from said vehicle that the flow of said fluid within said region is substantially unaffected by the motion of said vehicle through said fluid;
   means for diverting a portion of said light beam away from said predetermined direction;
   a light receiver, positioned upon said vehicle and directed toward said region of said focused beam to receive scattered light from said region, and adapted to receive said diverted portion of said light beam to produce a resultant signal having a frequency equal to the difference between the frequencies of said scattered light rays and said diverted light rays; and
   means responsive to the frequency of said difference frequency signal to create a signal which is a measure of said difference frequency, whereby said last named signal is a measure of the velocity of said vehicle relative to said fluid.

6. The apparatus for determining the velocity of a vehicle as described in claim 5 wherein a multi-dielectric light filter is interposed between said region of focused light and said light receiver for filtering from said scattered rays substantial amounts of background light.

7. Apparatus for determining the velocity of a vehicle as defined in claim 5 wherein said light receiver comprises a photosensitive square-law detector.

8. Apparatus for measuring the velocity of a vehicle relative to a surrounding fluid comprising:
   means for generating and projecting a coherent light into said fluid;
   receiver means for detecting light scattered by a portion of said fluid which has said light incident thereon; and
   means for mixing said generated and received light to produce a signal which corresponds to the velocity of said vehicle relative to said fluid.

9. Apparatus for measuring the velocity of a vehicle as described in claim 8 wherein said means for generating and projecting a coherent light comprises a ruby laser.

10. Apparatus for measuring the velocity of a vehicle as described in claim 8 wherein said receiver means includes a photo-detector and an optical system having a restricted field of view and further having its direction of sensitivity oriented in such a manner that it intersects the light beam of said coherent light, said optical system being positioned upon said vehicle for gathering light scattered by said fluid and directing the detected scattered light rays onto said photo-detector.

11. Apparatus for measuring the velocity of a vehicle as described in claim 10 wherein said receiver means further includes an optical mixer interposed in the optical path between said optical system and said photo-detector for combining a portion of said coherent light with the detected scattered light before said scattered light is directed onto said photo-detector.

12. Apparatus for measuring the velocity of a vehicle as described in claim 11 wherein said receiver means further includes a light-frequency band-pass filter for passing a very narrow range of wavelengths centered on the wavelength of said laser and limiting background light frequencies to a level substantially below that of the combined scattered light and coherent light signal.

13. Apparatus for measuring the velocity of a vehicle relative to a surrounding fluid comprising:
   means for generating and projecting a coherent light into said fluid;
   means positioned partially in the optical path of said coherent light for diverting therefrom a portion of said light to be used as a reference light source;
   receiver means for detecting light scattered by a predetermined portion of said fluid having said light incident thereon, said receiving means including an optical system having a limited field of view centered on a region of fluid through which said coherent light passes for gathering into said receiver means light scattered by said region, means further including a photo-detector and a light-frequency band-pass filter interposed between said optical system and said photo-detector, said photo-detector being responsive to light scattered by said fluid and said diverted reference light for generating a resultant signal having a frequency proportional to a Doppler frequency shift in said scattered light, said receiver means still further including means responsive said resultant signal for transforming the frequency of said resultant signal into a velocity signal, the velocity signal representing the velocity of the vehicle relative to said fluid region.

14. In combination:
   a vehicle adapted to move through a fluid;
   a transmitter of mono-chromatic light, mounted upon said vehicle and adapted to transmit light in a predetermined direction from said vehicle into said fluid to illuminate said fluid in predetermined regions;
   a light-scattering optical system upon said vehicle adapted to receive scattered light from predetermined portions of said fluid in said predetermined regions illuminated by said light transmitter; and
   means responsive to said received light, upon said vehicle, for producing a signal which is representative of the velocity of said vehicle relative to the fluid in said regions.

15. A device as recited in claim 14 and further comprising optical band-pass filter means in the path of said received scattered light to reduce the effects of background radiation.

16. In combination:
   a laser, upon a vehicle immersed in a fluid, whose light is directed into said fluid;
   light receiving means positioned upon said vehicle, adapted and directed to receive scattered laser light from a predetermined region of said fluid; and
   means responsive to said received light for determining the frequency of said received light which is a measure of the velocity of said vehicle relative to said predetermined region.

References Cited
UNITED STATES PATENTS 3,139,617  6/1964  Denman et al. _________ 343—8

OTHER REFERENCES

Horman M., Measurement of Atmospheric Transmissivity Using Backscattered Light from a Pulsed Source, JOSA, vol. 51, no. 6, June 1961, pp. 681–91.

RONALD L. WIBERT, Primary Examiner

V. P. McGRAW, Assistant Examiner